Patented Oct. 30, 1945

2,388,105

UNITED STATES PATENT OFFICE 2,388,105

SPECTROGRAPH

James A. Wilson, Linden, N. J., assignor to Standard Oil Development Company, a corporation of Delaware Application December 9, 1943, Serial No. 513,565

9 Claims. (Cl. 234—1.5)

This invention relates to an automatic recording device, and more particularly relates to means for placing fiduciary marks on a curve being recorded by such a recording device.

Various types of devices are known to the art for automatically and continuously recording values on a chart as a curve. Such devices are useful in the control of industrial processes. In this manner, such variables as concentration, temperature, pressure, etc. are easily recorded. Generally such variables are recorded as a function of time. However, it often becomes necessary to relate these or any other two variables to a third variable. Heretofore this has been a difficult operation, and it is therefore the principal object of this invention to provide means for placing a mark on a curve being recorded by an automatic recording device which will directly relate the other two variables to a third variable.

The present invention has been found particularly useful in connection with a device for recording the ratio of light intensity emitted or absorbed by various substances. These data are usually recorded as optical density against time. In such an operation it is often desirable that the change in optical density with wavelength be recorded. However, it has not been found possible to record three such variables simultaneously. Consequently it is another object of this invention to provide means for placing wavelength marks on an optical density time curve being recorded by an automatic recording device.

Figure 1:
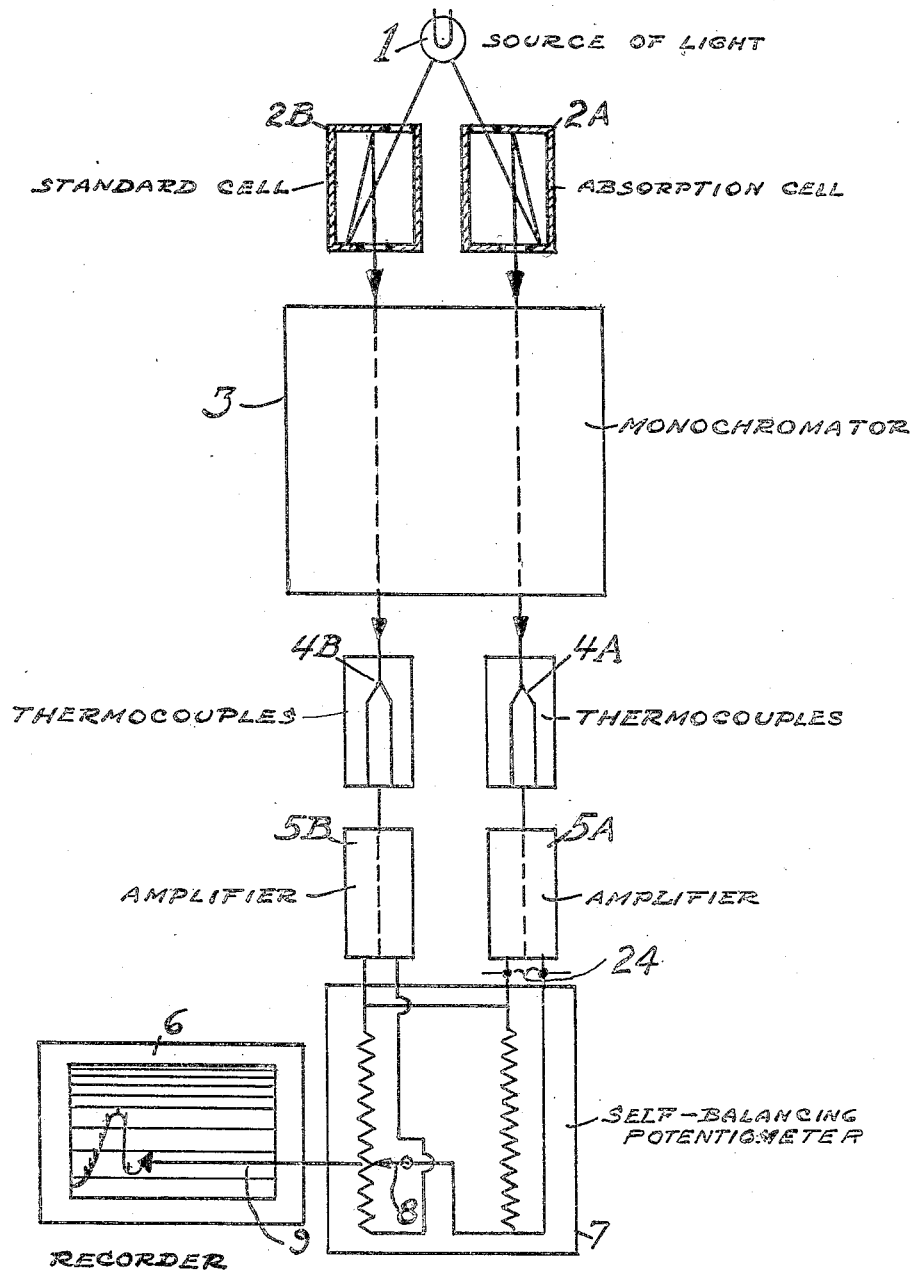
Figure 2:
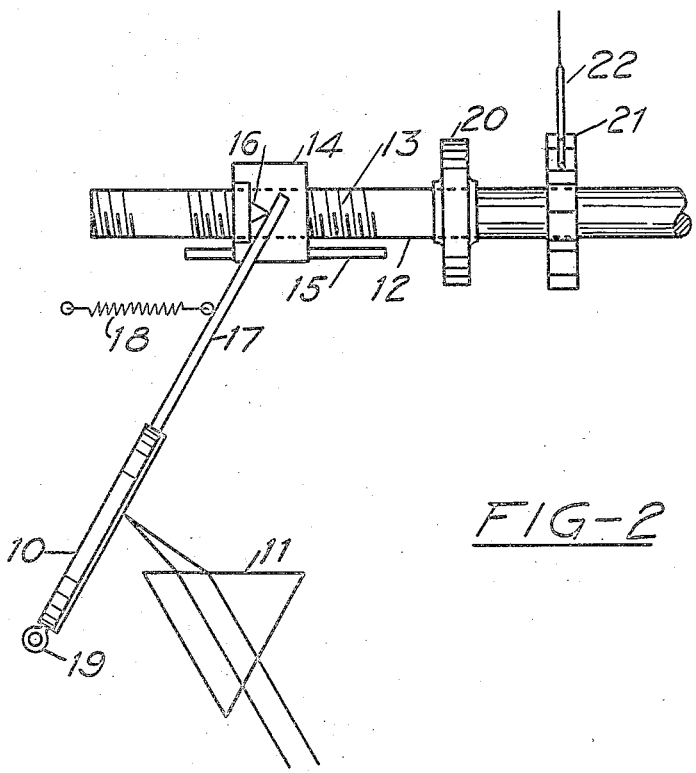
Figure 3:
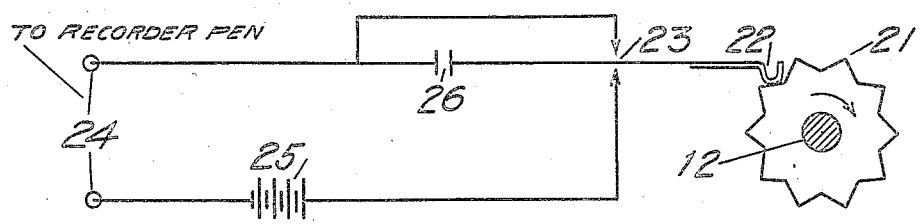
Figure 4:
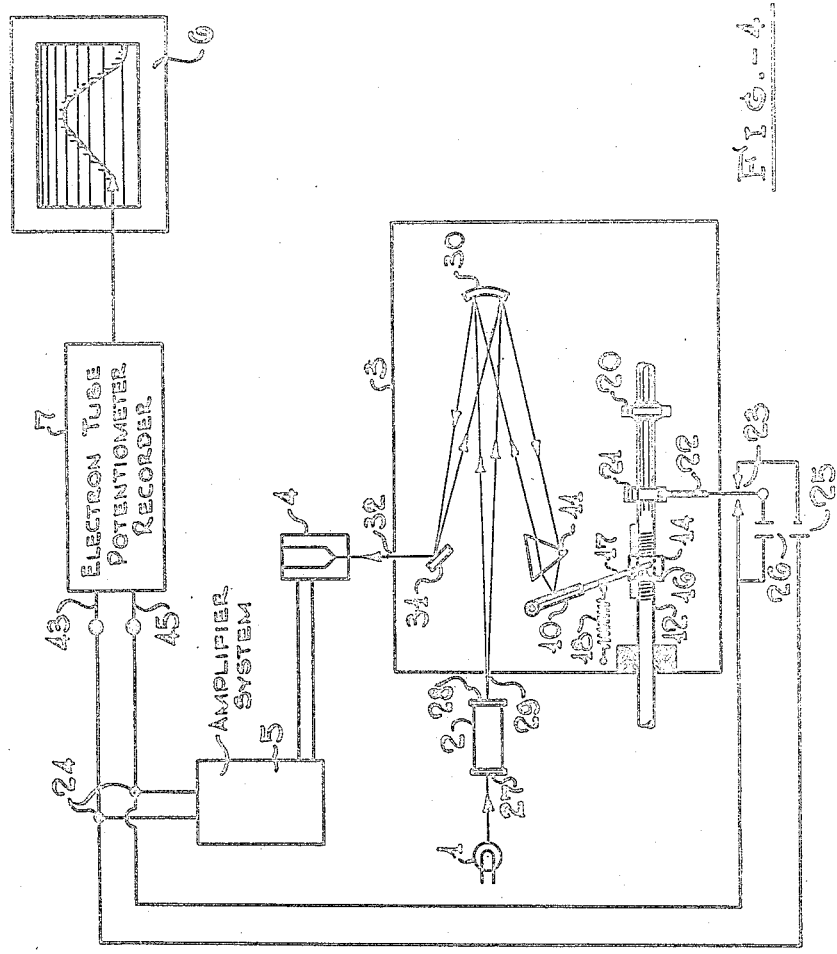
Figure 5:
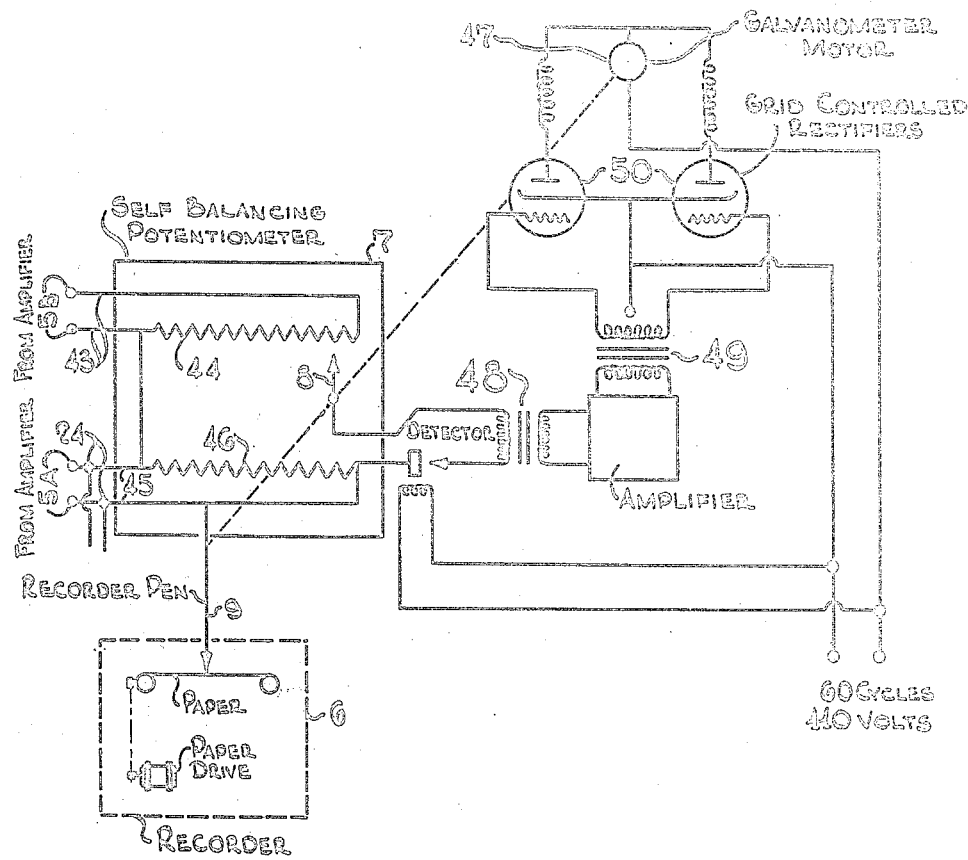

Other objects and advantages of this invention will become more apparent from the following specification when considered in connection with the accompanying drawings in which Figure 1 is a plan view showing the instrumental arrangement; Figure 2 is a diagrammatic view of the system for controlling the wavelength of the radiation used in a recording spectrograph; Figure 3 is a schematic view of the system for putting fiduciary marks on the recorded spectrum; Figure 4 is a diagrammatic view of the entire instrument showing the details of the monochromator and Figure 5 is a detailed view of the self-balancing potentiometer.

The invention will now be described in connection with a method for recording the optical density of a substance.

Referring to Figure 1, the light from a source 1 such as a Nernst glower is divided into two beams and passed through two separate absorption cells 2—A and 2—B, one of which contains the sample and the other is a blank or standard cell used to compensate for reflection and other losses in the sample cell. The two beams fall on different parts of the entrance slit of monochromator 3, passing through the same prism by means of which the respective rays are broken up into their component wavelengths. These resolved rays are then separately focused on separate parts of the exit slit of the monochromator and emerge from it as distinct beams. The two beams have intensities proportional to the amount of light incident on the absorption cell and transmitted through it, respectively. As each beam emerges from the monochromator, it is picked up by thermocouples 4—A and 4—B, respectively, and the resulting voltages are separately amplified photo-electrically by amplification systems 5—A and 5—B, respectively, until the resulting currents are large enough to operate a recorder 6.

The recorder used is a self-balancing potentiometric type in which a self-balancing potentiometer 7 continuously compares the voltage drop produced by the amplified current in the circuit containing the sample with a similar voltage produced by the current in the standard circuit.

Referring now to Figure 5 the amplified current from the standard circuit 5—B is conducted by leads 43 to a fixed resistor 44 having a sliding contact 8, while the current developed in the amplification circuit 5—A containing the sample is conducted by leads 45 to fixed resistor 46. Resistors 44 and 46 are connected directly at one end. The other end of resistor 46 is connected in series with a microphone shown generally at 48 which in turn is driven by a 60 cycle armature 49. The modulated current thus produced is applied to the grids of push-pull rectifiers 50. The plates of these tubes are supplied from the same source as the modulated armature and, therefore, have the same phase. The plate currents of the rectifiers drive a split-field reversing motor 47 which drives the potentiometer slide wire 8 for balancing the current from the two thermocouples. This contact is mechanically connected by means (not shown) to pen 9, which inscribes a line upon a chart in recorder 6. The finished chart is made to read directly in optical densities by use of microphotometer paper since the movement of recording pointer 9 is a direct function of the movement of sliding contact 8 which is in turn a function of the variation of the voltage drop produced by the amplified current in the circuit containing the sample with the voltage produced in the control circuit which voltages are in turn proportional to the amount of transmitted and incident light, respectively. The optical densities are plotted on the chart against time. However, by means of the device shown in Figures 2 and 3 wavelength marks can be inscribed directly on the resulting curve.

The path of the light beam through the monochromator is shown in Figure 4. For the sake of simplicity and clarity only one path will be shown since the path of the two beams is identical in this projection and passes through the same prism, the only difference being that the two beams follow one above the other on different parts of the entrance slit of the spectrometer.

Referring, therefore, to Figure 4 radiation from source 1 is passed into cells 2 through halite window 27 and out through halite window 28 and is then introduced into monochromator 3 through an adjustable slit 29. From the slit 29 the rays are directed onto an aluminized mirror 30, parabolized off its axis which in turn reflects them to a 60° dispersing prism 11 through which they are refracted to a pivoted mirror 10 which in turn reflects them back to the prism 11 from which they are refracted back to mirror 30 which reflects them to mirror 31 and thence through an adjustable slit 32. In passing through prism 11 the rays are broken up into their component wave lengths and only a narrow beam is allowed to pass through slit 32. However, by moving mirror 10 back and forth through a narrow arc the beam passing through slit 32 can be continuously changed. The means for accomplishing this will be described in detail below in connection with Figure 2. The rays emerging from slit 32 are focused on thermocouples 4 and amplified by means of amplifier 5 and recorded on potentiometer recorder 7 as described below.

Referring more particularly to Figures 2 and 3, a shaft 12 rotated by any suitable means, such as a synchronous motor, is provided with screw threads 13 carrying traveling nut 14 which moves along guide 15. Attached to traveling nut 14 is knife edge 16 across which is laid lever 17. This lever is held under tension by means of spring 18 and carries mirror 10 pivoted at 19 which reflects the light from collimating prism 11 in monochromator 3. Shaft 12 also carries drum 20 and toothed wheel 21. In contact with toothed wheel 21 is pawl 22 attached to a single pole, double throw switch 23 which is part of an electric circuit attached to the recording mechanism of recorder 6 at 24. Included within this circuit is battery 25 and condenser 26. Switch 23 is at all times directly connected to condenser 26 and is adapted to make or break the circuit between the battery and the condenser.

When shaft 12 is rotated, traveling nut 14 is moved along threads 13 and guide 15 causing lever 17 to slide along knife edge 16 and move mirror 10 through a small arc at pivot 19. This motion of the mirror causes the band of radiation passing through prism 11 to be scanned over the exit slit of the monochromator. By inscribing equal divisions upon drum 20 the angular motion of mirror 10 and thus the band of radiation being scanned may be easily determined.

The rotation of shaft 12 also causes toothed wheel 21 to turn and make contact with pawl 22 which is caused to ride on top of one of the teeth of wheel 21. When this occurs switch 23 is thrown upward short circuiting condenser 26 and opening the connection to battery 25. As the toothed wheel 21 turns, pawl 22 falls from the top of a tooth to the bottom, thereby changing the position of switch 23. The short circuit is broken and condenser 26 is connected to battery 25 permitting a transient current to flow through the recorder into condenser 26. This current gives the recorder a brief impulse that is indicated by a sudden excursion of the recorder pen. Since the current is only transient, the pen returns immediately to its original position. When the notched wheel 21 turns further, the pawl 22 is lifted, throwing the switch 23 back to its original position. The condenser 26 is then short circuited and discharged with the connection between battery 25 and condenser 26 open, preventing any impulse from reaching the recorder. The individual teeth on the toothed wheel 21 are set sufficiently apart so that each represents a convenient interval and thus each make of the circuit by the action of the toothed wheel 21 on the pawl 22 results in a fiduciary mark being made on the spectrum curve at a known wave length. In this manner, the motion of shaft 12 co-ordinates the band being scanned with the fiduciary marks made on the curve inscribed by the recorder.

While this invention has been described in connection with inscribing wave length marks on a recorded spectrum, as pointed out above the application of the invention is much broader and it can be used wherever it is desired to correlate a third variable with two other variables being recorded by any suitable recording device.

The nature and objects of the present invention having thus been described and illustrated, what is claimed as new and useful and is desired to be secured by Letters Patent is:

1. A spectrograph comprising means for recording the spectra of substances as a curve, means for continually changing the wavelength of the spectra being recorded, and means responsive to the said wavelength changing means for placing a wavelength mark on said curve.

2. A spectrograph comprising means for isolating a desired band of radiation, means for changing the wavelength of said isolated band, means for recording the spectra of said isolated band as a curve, and means responsive to said wavelength changing means for placing a wavelength mark on said curve.

3. An instrument for automatically recording the spectra of substances comprising, in combination, means for scanning a desired spectral range, means for continually drawing a curve in which optical density is plotted against time, and means responsive to said scanning means for placing a wavelength mark on said curve.

4. An instrument for automatically recording the spectra of substances comprising in combination means for scanning a desired spectral range, means for continually drawing a curve in which optical density is plotted against time, and means cooperating with the two foregoing means for placing a wavelength mark on said curve.

5. The combination with a recording spectograph provided with a pen in which the ratio of the intensity of two beams of radiation passing through separate absorption cells is recorded by the pen in the form of a curve as a function of time, means for scanning each of said beams of radiation over a definite wavelength band, and means responsive to said scanning means to cause said pen to periodically place a fiduciary mark upon the curve being transcribed.

6. The combination with a recording spectograph including a recorder provided with a pen in which the ratio of the intensity of two beams of radiation passing through separate absorption cells is recorded by the pen in the form of a curve as a function of time, and means for scanning each of said beams through a definite wavelength band, of an electric circuit connected to said recorder containing a source of direct current and a condenser in series, a switch in said circuit between said source of current and said condenser, a bypass from said switch over said condenser, and means cooperating with said switch and responsive to said scanning means for causing a transient current to flow through said circuit whereby said pen is caused to periodically place a fiduciary mark upon the curve being transcribed.

7. The combination with a recording spectograph including a recorder provided with a pen in which two beams of radiation are passed in parallel through separate absorption cells and then simultaneously through the same monochromator having an exit slit and containing a prism and a pivotable mirror for scanning said beam over the exit slit of said monochromator in which the relative density of the two beams is recorded by the pen in the form of a curve as a function of time, of a rotating shaft, means attached to said shaft for moving said mirror through a small arc, a toothed wheel on said shaft, a pawl riding on said wheel, and means responsive to said pawl and connected to said pen to cause said pen to inscribe a fiduciary mark upon the curve being transcribed.

8. The combination with an automatic recorder provided with a pen for transcribing a set of values in the form of a curve, of a rotating shaft, a toothed wheel on said shaft, a pawl riding on said wheel, an electric circuit connected to said recorder and containing a source of direct current and a condenser in series, a switch in said circuit between said source of current and said condenser, said switch being responsive to said pawl as said pawl rides on said toothed wheel whereby said switch is periodically operated to cause a transient current to pass through said recorder and cause said pen to periodically place a fiduciary mark upon the curve being transcribed.

9. The combination with a recording spectograph including a recorder provided with a pen in which two beams of radiation are passed in parallel through separate absorption cells and then simultaneously through the same monochromator having an exit slit and containing a prism and a pivotable mirror for scanning said beam over the exit slit of said monochromator in which the relative intensity of the two beams is recorded by the pen in the form of a curve as a function of time, of a rotating shaft, means attached to said shaft for moving said mirror through a small arc, a toothed wheel on said shaft, a pawl riding on said wheel, an electric circuit connected to said recorder and containing a source of direct current and a condenser in series, a switch in said circuit between said source of current and said condenser, said switch being responsive to said pawl as said pawl rides on said toothed wheel whereby said switch is periodically operated to cause a transient current to pass through said recorder and cause said pen to periodically place a fiduciary mark upon the curve being transcribed.

JAMES A. WILSON.